Figure 1:
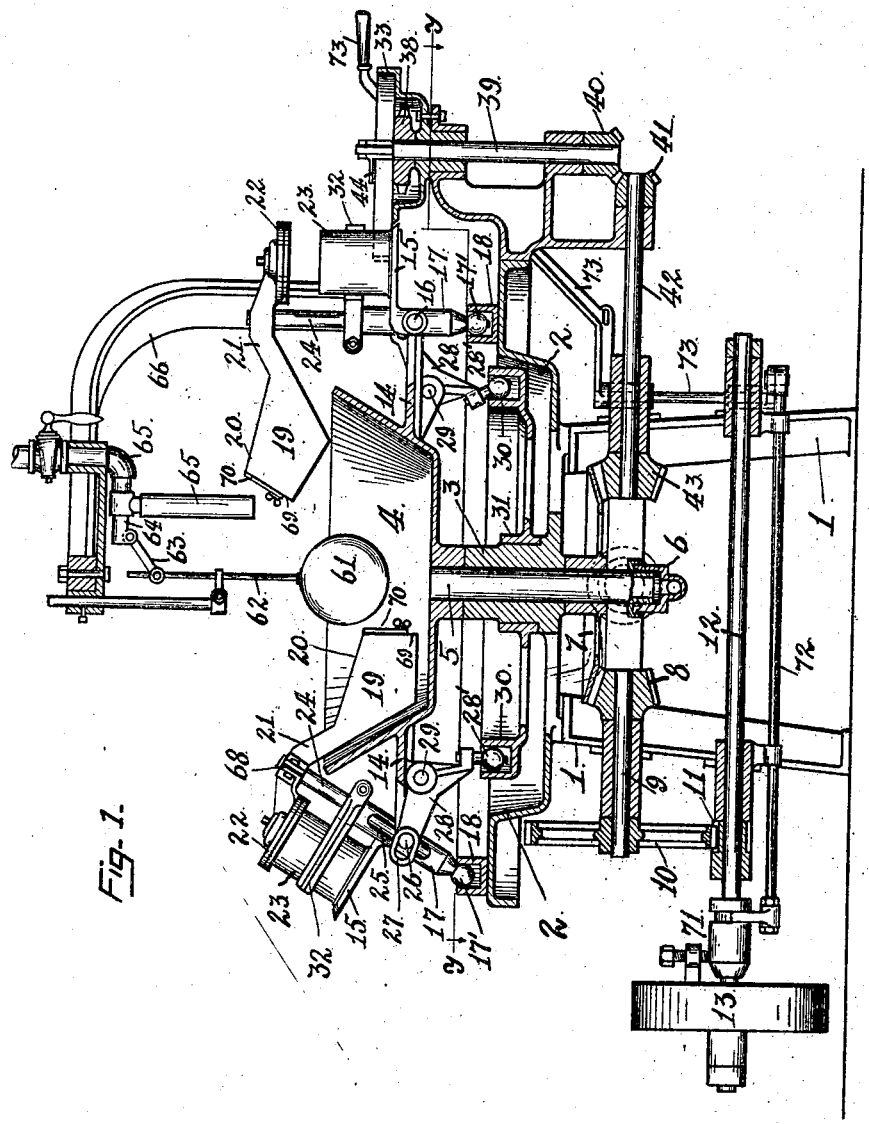

A. R. THOMPSON.
SYRUPER.
APPLICATION FILED NOV. 30, 1914.

1,147,346.

Patented July 20, 1915.
5 SHEETS—SHEET 1.

WITNESSES:
W. F. Drew.
S. Constine.

INVENTOR
Albert R. Thompson
BY
Wm. F. Booth
ATTORNEY

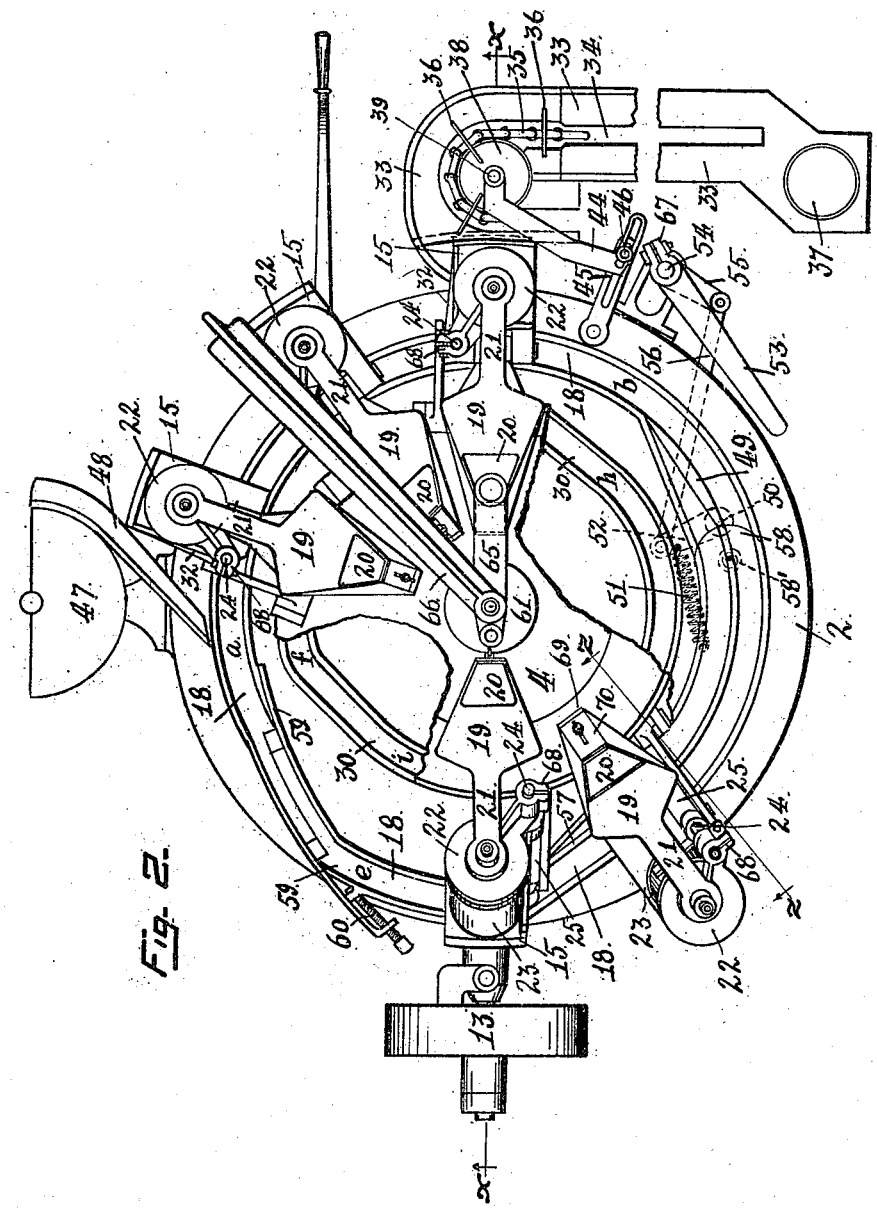

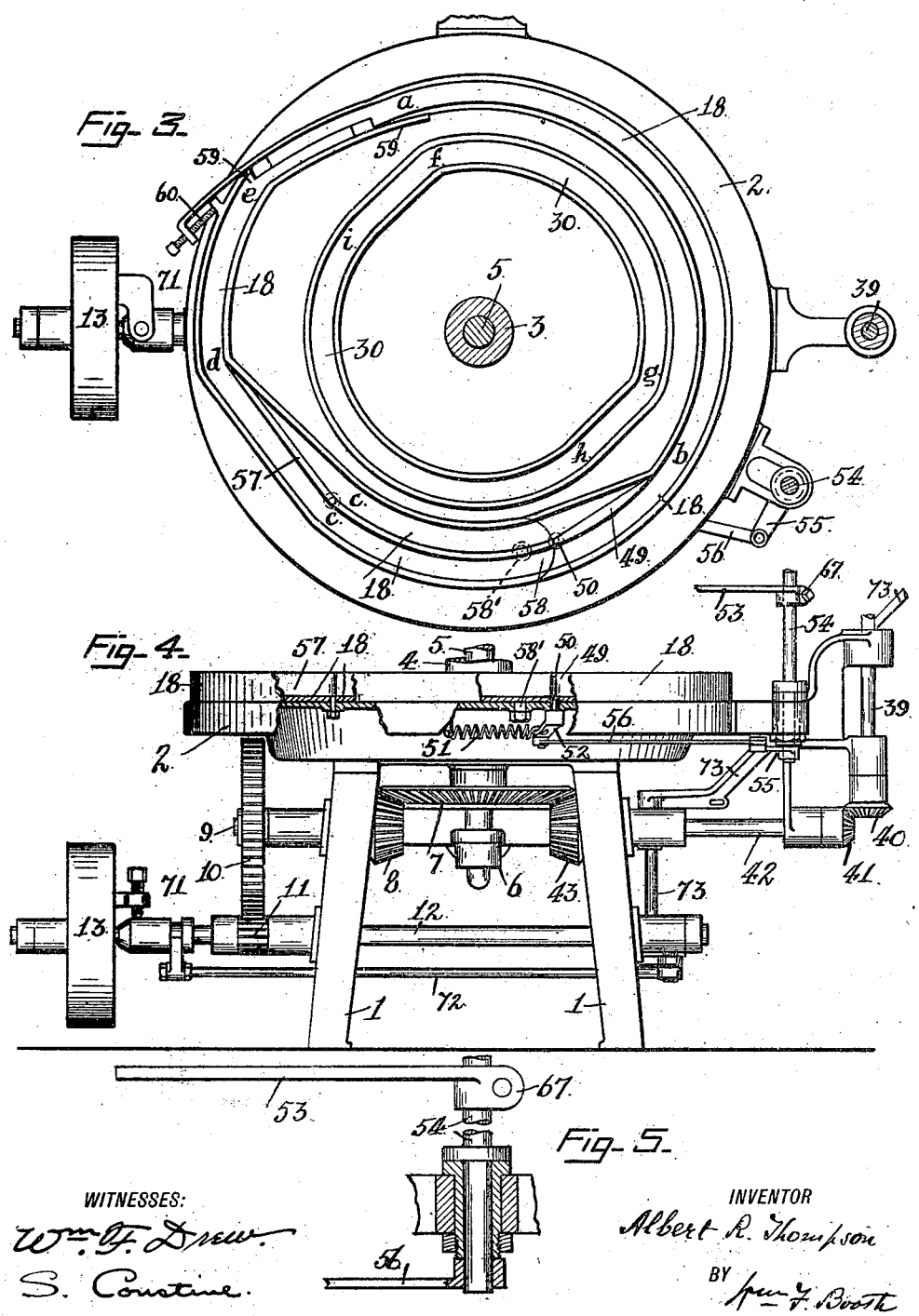

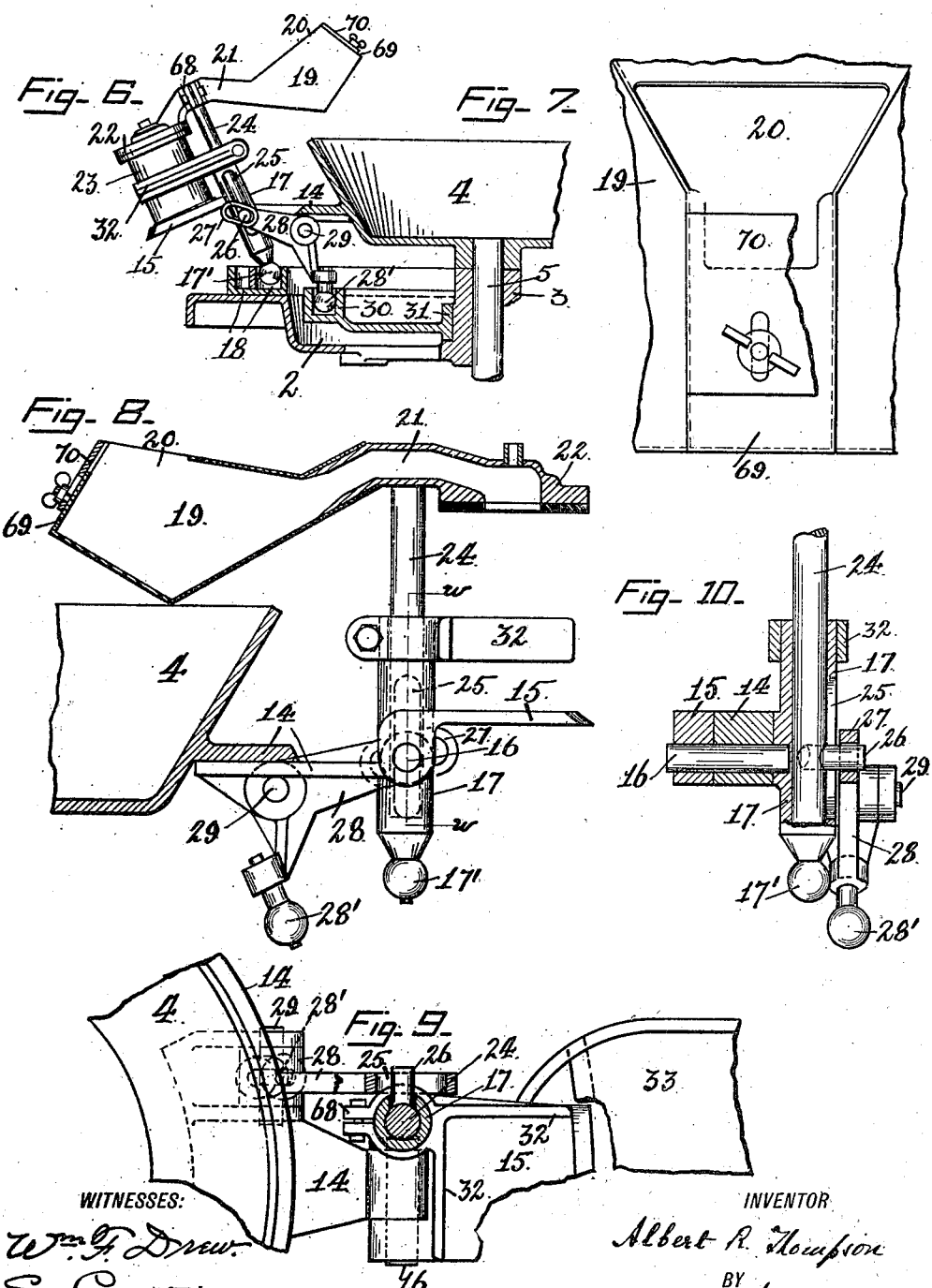

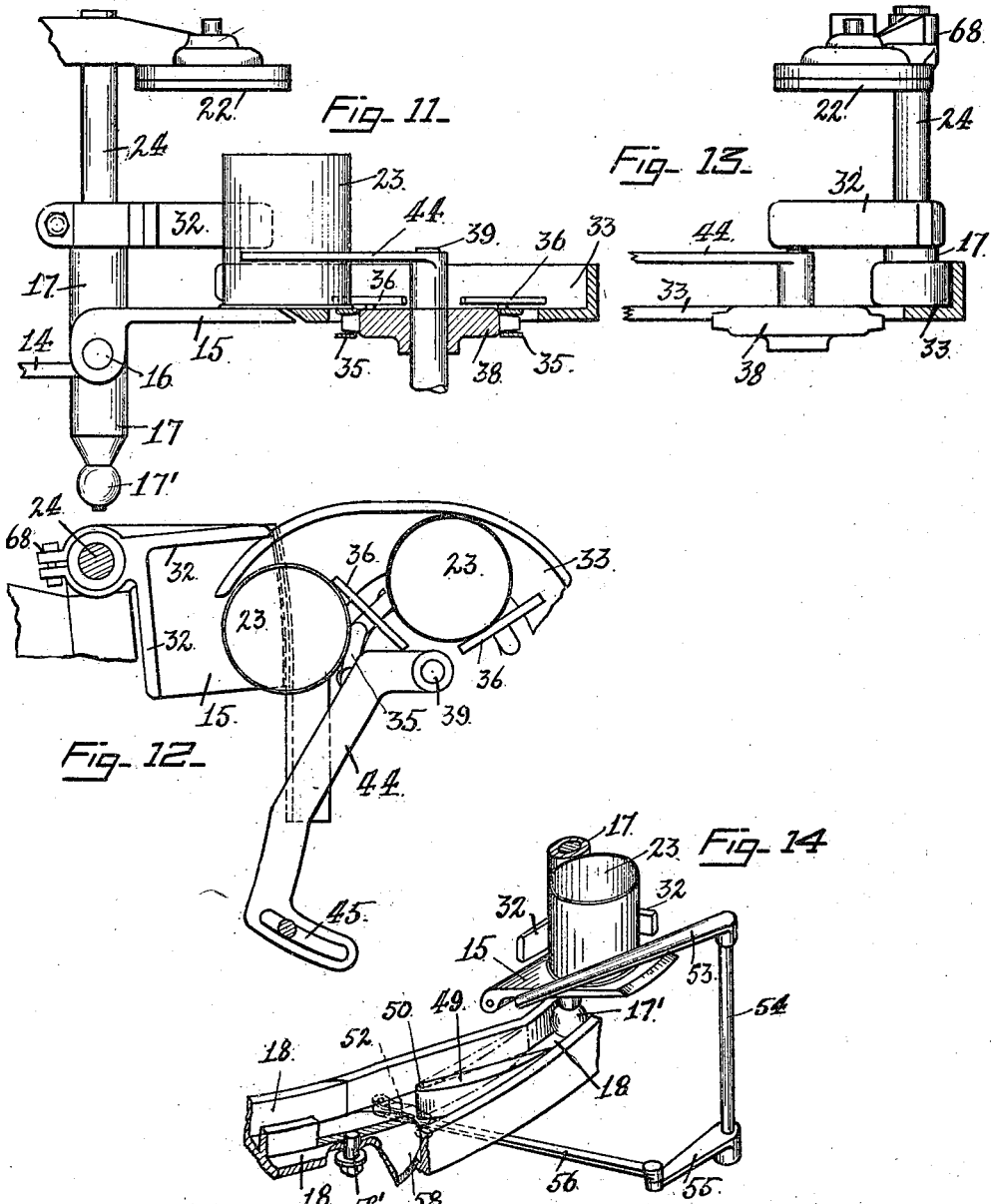

UNITED STATES PATENT OFFICE.

ALBERT R. THOMPSON, OF SAN JOSE, CALIFORNIA, ASSIGNOR TO ANDERSON-BARNGROVER MFG. CO., OF SAN JOSE, CALIFORNIA, A CORPORATION OF CALIFORNIA.

SYRUPER.

1,147,346.

Specification of Letters Patent.  Patented July 20, 1915.

Application filed November 30, 1914. Serial No. 874,647.

*To all whom it may concern:*

Be it known that I, ALBERT R. THOMPSON, a citizen of the United States, residing at San Jose, in the county of Santa Clara and State of California, have invented certain new and useful Improvements in Syrupers, of which the following is a specification.

My invention relates to the class of syrupers.

The object of my invention is to provide a simple and effective machine for supplying containers in continuous succession with syrup, and especially for furnishing fruit-filled cans with the proper amount of syrup in cleanly fashion and without waste.

To this end my invention consists in the novel machine and in the various combinations, arrangements, and construction of its several parts, and operative mechanisms, which I shall now fully describe by reference to the accompanying drawings, in which—

Figure 1 is a vertical central section of my syruper, on the line $x$—$x$ of Fig. 2. Fig. 2 is a plan view of the same, broken. Fig. 3 is a plan view on the line $y$—$y$ of Fig. 1, showing the cam-tracks. Fig. 4 is a side view, broken, of the stand, and the gearing and other parts carried thereby. Fig. 5 is a detail of the switch-operating lever. Fig. 6 is a detail view on the line $z$—$z$ of Fig. 2, showing the can-filling position of the can-table, can-cap and filling ladle. Fig. 7 is a broken detail view of the front of the filling ladle, showing its adjustable wall. Fig. 8 is a detail view enlarged, of the filling ladle and cap, and the can-table, showing them in position for receiving or discharging a can. Fig. 9 is a plan view of the same. Fig. 10 is a section on the line $w$—$w$ of Fig. 8. Fig. 11 is a detail view showing a can being fed to the table. Fig. 12 is a plan of the same. Fig. 13 is an elevation of the same. Fig. 14 is a perspective detail showing the operation of the switch-lever by a can.

1 is a stand, the top 2 of which is a pan-like structure, having a hub 3, which supports the rotatable superstructure, the main or central element of which is the syrup-supply tank 4. Rotation is imparted by a vertical shaft 5 secured to the tank 4, and journaled in the hub 3 of the stand top 2. The shaft 5 is stepped below at 6, and said shaft carries a gear 7, with which meshes a pinion 8 on a short shaft 9, which latter shaft carries a gear 10 with which meshes a pinion 11, on a drive shaft 12, which is driven from a pulley 13. Extending from the tank 4 is a circumferential flange 14, by which is carried an annular series of can-tables or supports. These tables 15, are pivoted to the flange 14 at 16, and each is provided with a stem 17 extending below its pivotal point, the extremity of the stem having a roller 17' which travels in a cam-track 18 carried by the rim of the stand-top 2.

19 are filling ladles or dippers. There is one of these for each can table. The body of the ladle has an open inlet at 20 to admit the syrup when the ladle is submerged, and the hollow neck 21 of each ladle carries and communicates with a filling cap 22, which is adapted to fit down over the top of the can 23 and to be lifted from said can. Each cap 22 is carried and operated by a rod 24 which is mounted and lineally movable in the stem 17 of the can-table. The stem 17 is slotted at 25, and in this slot plays a stud 26 of the rod 24. Slotted at 27 over the stud 26 is one arm of an angle lever 28, which is pivoted at 29 to the tank flange 14. The other arm of the angle lever 28 carries a roller 28' which travels in a fixed cam track 30 carried by a hub 31 on the hub 3 of the stand top 2.

Carried by the stems 17 of the can tables 15 are the guide arms 32, which lie over said can-tables in position to receive and steady a can thereon. The cans are fed to the tables by mechanism as follows, and which is best seen in Fig. 2: 33 is a can-feed table centrally slotted at 34. Under the table is a conveyer-chain 35, having can-pushers or flights 36 at intervals, which travel upon the table. The chain is carried by a terminal sprocket indicated at 37 and a driving sprocket 38, the latter being operated by a vertical shaft 39, driven by a pinion 40 on its lower end. The pinion 40 is engaged by a bevel pinion 41 on a shaft 42, the other end of which carries a bevel pinion 43 which is driven by the gear 7, of the central vertical shaft 5. The can-feed table 33 at its delivery end is so curved or directed toward the path of the can-tables 15, that in conjunction with a feed rail 44, the can will be forced over upon the can-table, at first gradually by that portion of the rail which inclines toward the path of the table and then fully by that portion which is concentric with said path—(Fig. 2). This feed-rail is made adjustable to provide for different sizes of cans. One end of the rail is pivotally carried on the top of the sprocket shaft 39, and the other end has a double slotted connection with a fixed bracket 45, said connection being controlled by a bolt and nut at 46.

47 is the can-discharge table, and 48 is the discharge rail, the inner end of which projects into the path of the cans in position to direct them from the can tables to the discharge table.

By referring to Figs. 2 and 3, particularly the latter, the course of the cam-track 18 and its construction will be seen. From a point a little before the place of discharge of the cans, to a point a little after the place of feed, say, from $a$ to $b$, the track is single and has a given radius. After this latter point, the track is doubled, say from $b$ to $c$, the outer track continuing on the same radius as before, and the inner track having a shorter radius. The point of divergence of the two tracks is controlled by a switch 49, pivoted at 50. This switch is held to normally close the inner track, by means of a spring 51 connected with a crank arm 52 of the pivot of the switch. The switch swings to close the outer track and open the inner track by a can 23 which in the course of its travel is adapted to contact with a lever 53, one end of which lies in the path of the can and the other end is secured on a rock shaft 54 which carries an arm 55 connected by a link 56 with the switch crank-arm 52. At the point $c$ the double track converges to a single one again, the convergence being controlled by a swinging tongue 57. From the point $c$ the cam track rapidly inclines outwardly to the point $d$; and thence to the point $e$, it continues for a short distance on a curve of longest radius, whence it again inclines inwardly to the point of beginning at $a$. In general terms the effect of this course of the cam track 18 is to hold the can-table 15 horizontal from $a$ to $b$; then by means of the inner member of the doubled track, to tilt the can table outwardly, that is, away from the center, from $b$ to $c$; then from $c$ to $d$ to tilt it inwardly, or toward the center, and from $d$ to $e$ to so hold it tilted inwardly, and, finally, from $e$ to $a$ it returns the table to a horizontal. If, however, a can be not fed to a table, the switch 49 will keep the inner member of the track 18 closed, and then from $b$ to $c$ the outer member of the doubled track will be effective, and the table will not tilt outwardly.

Now in order to provide for varying the angle to which the can-tables will be tilted, I have the following adjustment of a portion of cam-track 18: Near the beginning of the doubling of the track, as shown at 58, the track is severed and from thereon to the free end at 59, said track is not fixed to the stand-top 2 on which its rests, but is free to move thereon. This severed section from 58 to 59 is pivoted near its beginning, as seen at 58', and at its free end it slidingly overlaps the continuing fixed portion of the track. In this fixed portion is threaded an adjusting screw 60 which is connected with the free end of the movable section. By operating this screw, the entire movable section of the track may be set in or out, that is, toward or from the center, said section turning on its pivot at 58'.

Referring now to the cam-track 30 which controls the movements of the filling caps 22 to and from the cans, it will be seen from Fig. 3, that from the point $f$ a little before the place of can discharge to the point $g$, a little after the place of can feed, the track has a given radius; from point $g$ to point $h$ it rapidly inclines inwardly, and thence it proceeds on a shorter radius to the point $i$, from which it inclines outwardly to the beginning at $f$. The effect of this course is that from $f$ to $g$ the filling cap 22 is held above and free of the can; then from $g$ to $h$ the cap descends to the can, reaching it at the point $h$; then from $h$ to $i$, the cap is held tightly clamped on the top of the can; and from $i$ to $f$ the cap rises to its elevated position.

In order to automatically keep the level of the syrup in the supply-tank 4 constant, there is a float 61 in said tank. This float, through its stem 62 and a link 63, operates the controlling valve 64 in the supply pipe 65, all these parts being carried by a bracket 66.

In order to adapt the switch actuating lever 53 for different diameters of cans, said lever is clamped upon its shaft 54, as shown at 67. By relieving the clamp the lever may be initially adjusted to properly place its inner end for contact with such size cans as may be passing through the machine.

In order to adjust the movement of the filling caps 22 to different heights of cans, said caps are secured by means of clamps 68 on top of the vertically movable rod 24. The caps may, therefore, be set farther down or up on said rods, according as the height of the cans may require.

In order to vary the capacity of the ladles 19, their front wall 69 may have a vertically adjustable section 70.

The operation of the machine is as follows:—As one of the can-tables 15 reaches the place of can feed, it is horizontal and its filling cap 22 lies above the can-top level, so that a can may enter upon the table below the cap. At this time, supposing the machine to have been in operation through a previous cycle, the ladle 19 of this cap has its charge of syrup, but the inclination of the ladle is such that its contents does not flow therefrom. At this same time a can 23, fed by a pusher flight 36 of the feed chain 35, and guided by the rail 44, is being directed to and upon the table 15 and is held and steadied thereon by the arms 32. As the can-table advances, the roller 28' traveling in the inwardly inclined portion of the cam-track 30, carries the cap 22 to descend upon the top of the can and close said can. Then the can, advancing still, comes in contact with the lever 53 and moves it outward. This movement throws the switch 49 to open the inner member of the cam-track 18 to the roller 17', and said roller traveling in said inner member, tilts the can-table outwardly, the cap 22 being still held tightly to the can, by the roller 28' traveling in its cam-track 30. This outward tilting of the can-table, elevates the ladle 19 to such an angle that the syrup contained in said ladle flows through its hollow neck 21 and through the cap 22 into and fills the can. Then while the cap is still held tightly upon the top of the can, the roller 17' traveling in the outwardly inclined portion of the cam-track 18 from $c$ to $d$, tilts the table inwardly and this movement has the double effect of causing the excess of syrup from the can to run back through the cap and ladle-neck into the ladle, and of causing the ladle itself to dip down into the supply tank 5, whereby it receives its charge of syrup. Then the roller 17' reaching the inwardly inclined portion of the cam-track 18 from $e$ to $a$, causes the can table to assume a horizontal position whereby the can is uprighted. This movement also lifts the ladle with its charge of syrup out of the supply-tank 5. During this same time the roller 28' traveling in the outwardly inclined portion of the cam track 30 lifts the cap and ladle. The can now reaches the discharge rail 48 and is directed outwardly from the can-table 15 to and upon the discharge table 47. Then the can table 15 with its elevated cap 22 and its charged ladle 19 proceeds to the place of feed and the operation is repeated.

If, by chance, a can should not be fed to a table, the lever 53 will not be operated and the switch 49 will keep the inner member of the doubled portion of the cam track 18 closed, so that the roller 17' will travel in the outer member of said doubled portion, and the table will, therefore, not be tilted outwardly. The ladle 19 will thus not be elevated to pour its contents through its hollow neck and no syrup will be spilled.

71 indicates a clutch actuating device for throwing the pulley 13 into and out of action. This device is operated by the rod 72, and the lever 73.

I claim:—

1. In a syruper, the combination of a liquid-supply tank; a can-support; a filling-ladle carried by said support in communication with the can thereon; and means for rocking the support to cause the ladle to dip the liquid from the tank and pour it into the can, and to pour back into the ladle a liquid surplus from the can.

2. In a syruper, the combination of a liquid-supply tank; a can-support; a cap carried by said support; a filling-ladle carried by the cap and communicating therethrough with the can on the support; and means for rocking the support to cause the ladle to dip the liquid from the tank and pour it through the cap into the can.

3. In a syruper, the combination of a liquid-supply tank; a can-support; a cap carried by said support; a filling-ladle carried by the cap and communicating therethrough with the can on the support; and means for rocking the support to cause the ladle to dip the liquid from the tank and pour it through the cap into the can, and to pour back through the cap into the ladle, a liquid surplus from the can.

4. In a syruper, the combination of a liquid-supply tank; a can-support; a cap carried by said support; a filling-ladle carried by the cap and communicating therethrough with the can on the support; means for rocking the support to cause the ladle to dip the liquid from the tank and pour it through the cap into the can; and means for moving the cap to and from the can top.

5. In a syruper, the combination of a liquid-supply tank; a can-support; a cap carried by said support; a filling-ladle carried by the cap and communicating therethrough with the can on the support; means for rocking the support to cause the ladle to dip the liquid from the tank and pour it through the cap into the can, and to pour back through the cap into the ladle, a liquid surplus from the can; and means for lowering the cap to the can top prior to the filling of the can from the ladle, and raising it therefrom after the liquid surplus has been poured back from the can.

6. In a syruper, the combination of a rotatable liquid-supply tank; an annular series of tiltable can-supports carried by and rotatable with said tank; a filling-ladle carried by each of said can supports in communication with the can thereon; and means, actuated by the rotation of the can-support series, for rocking said supports to cause the ladles to dip the liquid from the tank and pour it into the cans.

7. In a syruper, the combination of a rotatable liquid-supply tank; an annular series of tiltable can-supports carried by and rotatable with said tank; a filling-ladle carried by each of said can supports in communication with the can thereon; and means, actuated by the rotation of the can-support series, for rocking said supports to cause the ladles to dip the liquid from the tank and pour it into the cans, and to pour back into the ladles a liquid surplus from the cans.

8. In a syruper, the combination of a rotatable liquid-supply tank; an annular series of tiltable can-supports carried by and rotatable with said tank; a cap carried by each can-support; a filling-ladle carried by each cap and communicating therethrough with the can on the support; and means, actuated by the rotation of the can-support series, for rocking said supports to cause the ladles to dip the liquid from the tank and pour it through the caps into the cans.

9. In a syruper, the combination of a rotatable liquid-supply tank; an annular series of tiltable can-supports carried by and rotatable with said tank; a cap carried by each can-support; a filling-ladle carried by each cap and communicating therethrough with the can on the support; and means, actuated by the rotation of the can-support series, for rocking said supports to cause the ladles to dip the liquid from the tank and pour it through the caps into the cans, and to pour back through the caps into the ladles, a liquid surplus from the cans.

10. In a syruper, the combination of a rotatable liquid-supply tank; an annular series of tiltable can-supports carried by and rotatable with said tank; a cap carried by each can-support; a filling-ladle carried by each cap and communicating therethrough with the can on the support; means, actuated by the rotation of the can-support series, for rocking said supports to cause the ladles to dip the liquid from the tank and pour it through the caps into the cans; and means for moving the caps to and from the cans.

11. In a syruper, the combination of a rotatable liquid-supply tank; an annular series of tiltable can-supports carried by and rotatable with said tank; a cap carried by each can-support; a filling-ladle carried by each cap and communicating therethrough with the can on the support; means, actuated by the rotation of the can-support series, for rocking said supports to cause the ladles to dip the liquid from the tank and pour it through the caps into the cans, and to pour back through the caps into the ladles, a liquid surplus from the cans; and means for lowering the caps to the cans prior to the filling of the can and lifting them therefrom after the surplus has been poured back.

12. In a syruper, the combination of a rotatable liquid-supply tank; an annular series of can-tables pivotally carried by and rotatable with said tank, each table having a stem; a filling-ladle carried by each can-table in communication with the can thereon; and a cam-track with which the stems of the can-tables engage, to rock the tables to cause the ladles to dip the liquid from the tank and pour it into the cans.

13. In a syruper, the combination of a rotatable liquid-supply tank; an annular series of can-tables pivotally carried by and rotatable with said tank, each table having a stem; a filling-ladle carried by each can-table in communication with the can thereon; and a cam-track with which the stems of the can-tables engage, to rock the tables to cause the ladles to dip the liquid from the tank and pour it into the cans, and to pour back into the ladles a liquid surplus from the cans.

14. In a syruper, the combination of a rotatable liquid-supply tank; an annular series of can-tables pivotally carried by and rotatable with said tank, each table having a stem; a cap carried by each table; a filling-ladle carried by each cap and communicating therethrough with the can on the table; and a cam-track with which the stems of the can-tables engage to rock the tables to cause the ladles to dip the liquid from the tank and pour it through the caps into the cans.

15. In a syruper, the combination of a rotatable liquid-supply tank; an annular series of can-tables pivotally carried by and rotatable with said tank, each table having a stem; a cap carried by each table; a filling-ladle carried by each cap and communicating therethrough with the can on the table; and a cam-track with which the stems of the can-tables engage to rock the tables to cause the ladles to dip the liquid from the tank and pour it through the caps into the cans, and to pour back through the caps into the ladles, a liquid surplus from the cans.

16. In a syruper, the combination of a rotatable liquid-supply tank; an annular series of can-tables pivotally carried by and rotatable with said tank, each table having a stem; a cap carried by each table; a filling-ladle carried by each cap and communicating therethrough with the can on the table; a cam-track with which the stems of the can-tables engage to rock the tables to cause the ladles to dip the liquid from the tank and pour it through the caps into the cans; and means for moving the caps to and from the cans comprising a rod carrying each cap, a slidable connection of said rod with the can-table, a lever to operate said rod and a cam-track with which said lever engages.

17. In a syruper, the combination of a rotatable liquid-supply tank; an annular series of can-tables pivotally carried by and rotatable with said tank, each table having a stem; a cap carried by each table; a filling-ladle carried by each cap and communicating therethrough with the can on the table; a cam-track with which the stems of the can-tables engage to rock the tables to cause the ladles to dip the liquid from the tank and pour it through the caps into the cans, and to pour back through the caps into the ladles, a liquid surplus from the cans; and means for lowering the caps to the cans prior to the filling of the can and lifting them therefrom after the surplus has been poured back, comprising a rod carrying each cap, a slidable connection of said rod with the can-table, a lever to operate said rod and a cam-track with which said lever engages.

18. In a syruper, the combination of a rotatable liquid-supply tank; an annular series of can-tables pivotally carried by and rotatable with said tank; a filling ladle carried by each can-table in communication with the can thereon; a cam-track adapted to effect the rocking of the can-tables to cause the ladles to dip the liquid from the tank and pour it into the cans; a switch in said cam-track normally cutting out its effect of filling the cans from the ladles; and means operated by the contact of the cans for opening said switch to effect said filling.

19. In a syruper, the combination of a rotatable liquid-supply tank; an annular series of can-tables pivotally carried by and rotatable with said tank; a filling ladle carried by each can-table in communication with the can thereon; a cam-track adapted to effect the rocking of the can-tables to cause the ladles to dip the liquid from the tank and pour it into the cans; a switch in said cam-track normally cutting out its effect of filling the cans from the ladles; means operated by the contact of the cans for opening said switch to effect said filling; and means for adjusting said contact means to provide for their operation by cans of different diameters.

20. In a syruper, the combination of a rotatable liquid-supply tank; an annular series of can-tables pivotally carried by and rotatable with said tank, each table having a stem; a filling-ladle carried by each can-table in communication with the can thereon; and a cam-track with which the stems of the can-tables engage to rock the tables to cause the ladles to dip the liquid from the tank and pour it into the cans, said cam-track having a movable section to provide for varying the angle to which the can tables are rocked.

21. In a syruper, the combination of a liquid-supply tank; a can-table; a cap carried by the can-table; a filling-ladle carried by the cap, said ladle being in communication through said cap with a can on the table; means for rocking said table to cause the ladle to dip the liquid from the tank and pour it through the cap into the can; means for moving the cap to and from the can-top; and means for adjusting the cap relatively to said can-top to provide for different heights of cans.

In testimony whereof I have signed my name to this specification in the presence of two subscribing witnesses.

ALBERT R. THOMPSON.

Witnesses:
 WM. F. BOOTH,
 D. B. RICHARDS.